US012687490B2

(12) United States Patent
Le Perchec et al.

(10) Patent No.: US 12,687,490 B2
(45) Date of Patent: Jul. 21, 2026

(54) MULTISPECTRAL REFLECTION IMAGING SYSTEM

(71) Applicant: COMMISSARIAT A L'ENERGIE ATOMIQUE ET AUX ENERGIES ALTERNATIVES, Paris (FR)

(72) Inventors: Jérôme Le Perchec, Grenoble Cedex (FR); Mathieu Dupoy, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 255 days.

(21) Appl. No.: 18/478,303

(22) Filed: Sep. 29, 2023

(65) Prior Publication Data

US 2024/0110867 A1     Apr. 4, 2024

(30) Foreign Application Priority Data

Sep. 30, 2022     (FR) ..................................... 22 10015

(51) Int. Cl.
*G01N 21/17*          (2006.01)
*G01N 21/47*          (2006.01)

(52) U.S. Cl.
CPC ..... *G01N 21/47* (2013.01); *G01N 2021/1765* (2013.01); *G01N 2021/4709* (2013.01);
(Continued)

(58) Field of Classification Search
CPC ........... G01N 21/47; G01N 2021/1765; G01N 2021/4709; G01N 2201/0633;
(Continued)

(56) References Cited

U.S. PATENT DOCUMENTS 6,305,813 B1 * 10/2001 Lekson ................. F21S 43/245
                                                                  362/625
6,422,713 B1 * 7/2002 Fohl ....................... G02B 27/09
                                                                  362/339

(Continued)

FOREIGN PATENT DOCUMENTS

WO     WO 2015/167492 A1     11/2015
WO     WO 2022/030116 A1     2/2022

OTHER PUBLICATIONS

Preliminary French Search Report issued May 15, 2023 in French Application 22 10015 filed on Sep. 30, 2022, 11 pages (with English Translation of Categories of Cited Documents & Written Opinion).

*Primary Examiner* — Isiaka O Akanbi
(74) *Attorney, Agent, or Firm* — Oblon, McClelland, Maier & Neustadt, L.L.P.

(57)          ABSTRACT

An imaging device (100) configured to image a sample (102), comprising:
   a light source (104) emitting a light;
   a light deflection device configured to deflect the light emitted by the light source towards the sample, comprising a material portion (106) provided with a first main face (108) arranged opposite the sample (102), a second main face (110), and a first lateral face (112) towards which the light is emitted by the light source;
   an imager (118) having a detection face (122) arranged opposite the second main face and intended to receive the light backscattered by the sample;
wherein one amongst the main faces is provided with oblique portions (114) each configured to deflect a portion of the received light towards the sample (102), and with planar portions (116) configured to let the light backscattered by the sample pass, (Continued)

and wherein each pixel (120) of the imager (118) is arranged opposite one of the planar portions (116) of said one amongst the first and second main faces (108, 110).

11 Claims, 3 Drawing Sheets

(52) U.S. Cl.
CPC ................ *G01N 2201/0633* (2013.01); *G01N 2201/0636* (2013.01)

(58) Field of Classification Search
CPC ........... G01N 2201/0636; G01N 21/31; G01N 21/3563; G01N 2021/3155; G01N 21/255; G01N 21/474; G02B 6/0048
USPC ................................................. 356/336–338
See application file for complete search history.

(56) References Cited

U.S. PATENT DOCUMENTS

| | | | | |
|---|---|---|---|---|
| 6,824,284 | B2 * | 11/2004 | Chinniah | .............. F21S 43/245 |
| | | | | 362/330 |
| 7,073,933 | B2 * | 7/2006 | Gotoh | .................. G02B 6/0016 |
| | | | | 362/624 |
| 12,398,854 | B2 * | 8/2025 | Lim | ........................ F21S 43/14 |
| 2001/0019479 | A1 * | 9/2001 | Nakabayashi | ....... G02B 6/0028 |
| | | | | 349/64 |
| 2005/0180167 | A1 * | 8/2005 | Hoelen | ................ G02B 6/0046 |
| | | | | 362/613 |
| 2006/0221642 | A1 * | 10/2006 | Daiku | .................... B60K 35/22 |
| | | | | 362/626 |
| 2009/0274419 | A1 * | 11/2009 | Sayers | ................... G02B 6/001 |
| | | | | 385/36 |
| 2011/0242298 | A1 * | 10/2011 | Bathiche | .............. G02B 26/108 |
| | | | | 348/54 |
| 2012/0127573 | A1 * | 5/2012 | Robinson | ............... G02B 30/33 |
| | | | | 359/464 |
| 2012/0299913 | A1 | 11/2012 | Robinson et al. | |
| 2013/0286678 | A1 * | 10/2013 | Sugiyama | ........... H04N 13/376 |
| | | | | 362/602 |
| 2014/0333738 | A1 | 11/2014 | Robinson et al. | |
| 2017/0052384 | A1 * | 2/2017 | Santori | .................. G02B 21/00 |
| 2017/0160554 | A1 | 6/2017 | Robinson et al. | |
| 2018/0165497 | A1 * | 6/2018 | Lee | ........................ G06F 3/0421 |
| 2021/0271845 | A1 | 9/2021 | Riehl et al. | |

* cited by examiner

MULTISPECTRAL REFLECTION IMAGING SYSTEM

TECHNICAL FIELD

The invention relates to the imaging field, in particular multispectral reflection imaging, in the visible and/or infrared (IR) range. Advantageously, the invention may be used for the analysis of micro-organisms, cells, biological tissues, or for disease diagnosis.

PRIOR ART

In order to obtain an image of a biological sample to be analysed, one solution consists in mapping the sample via a microscope associated with a polychromatic IR source and a Fourier-transform IR spectrometer, or FTIR ("Fourier-transform infrared spectroscopy"). Such a system allows scanning the sample and obtaining multispectral images of the sample. One drawback of this type of solutions is that the analysis of a sample surface of a few $cm^2$ is longer because of the millions of obtained spectra and the voluminous data sets to be processed resulting therefrom. Such a system is also complex, expensive and bulky. The emergence of quantum cascade lasers, or QCL (acronym for "Quantum Cascade Laser"), allows making a plurality of monochromatic IR sources covering the entirety of the spectral domain of a polychromatic IR source. With such laser light sources, it is no longer necessary to use a FTIR spectrometer to spectrally analyse the light having interacted with the sample. An IR-sensitive detector is enough to quantify the intensity of the light transmitted or scattered by the sample, for each of the wavelengths selected as being relevant for the analysis.

Another constraint is that IR multispectral transmission imaging does not allow biochemically mapping thick samples, in particular because of the considerable light absorption by the water present in the biological samples. In order to get rid of this absorption, IR reflection spectrometry has been developed using the attenuated total reflection phenomenon, or ATR ("Attenuated Total Reflectance"). This requires arranging the measuring system the closest to the sample. Nonetheless, this method has two major drawbacks:
  the low penetration of the evanescent waves into the
    sample, requiring an arrangement of the sample the
    closest to the measuring system;
  the low imaged object field.
To overcome these drawbacks, the document FR 3 110 979 A1 provides a chip provided with an array of deflector gratings. Nonetheless, this chip type has the following drawbacks:
  limited spectral band;
  complex making of the deflector gratings;
  masking of the bolometers arranged beneath the deflector
    gratings.
An alternative solution is described in the document EP 3 916 441 A1 which proposes making a chip starting from an etched silicon substrate to enable the entry of a laser beam from the face of the substrate located on the side of the array of bolometers serving as a sensor. Nonetheless, this chip has the following drawbacks:
  large size;
  too significant absorption of the light by silicon;
  complex injection of the light into the chip.

DISCLOSURE OF THE INVENTION

The present invention aims to provide a multispectral reflection imaging system provided with an optical system devoid of the above-described drawbacks.

For this purpose, the present invention provides an imaging device configured to image a sample, comprising at least:
  a first light source configured to emit a light;
  a light deflection device configured to deflect the light
    intended to be emitted by the first light source towards
    the sample, comprising a material portion provided
    with a first main face intended to be arranged opposite
    the sample, a second main face opposite to the first
    main face, and a first lateral face towards which the
    light is intended to be emitted by the first light source;
  one amongst the first and second main faces being provided
  with oblique portions with respect to the other one amongst
  the first and second main faces and each configured to
  deflect a portion of the received light towards the sample,
  and with planar portions parallel to the other one amongst
  the first and second main faces and configured to let the light
  backscattered by the sample pass;
    an imager comprising a plurality of pixels and having a
      detection face arranged opposite the second main face
      of the light deflection device and intended to receive
      the light backscattered by the sample;
  wherein each pixel of the imager is arranged opposite one of
  the planar portions of said one amongst the first and second
  main faces.

In this imaging device, the light is first emitted at least by the first light source on the side of the first lateral face of the material portion of the light deflection device. Afterwards, this light is deflected by the oblique portions of one amongst the first and second main faces (which correspond to the two faces with larger dimensions) of the material portion towards the sample. After having reached the sample and interacted with the latter, the light is backscattered by the sample, passes through the material portion throughout the planar portions of one amongst the first and second main faces and throughout the other one amongst the first and second main faces of the material portion, and is then captured by the imager in order to obtain an image of the sample at the wavelengths of the light emitted by the first light source.

In contrast with the imaging device provided with an array of deflector gratings, the imaging device proposed herein implements a light deflection device that is less complex to make and adapted to deflect light over a larger spectral band as the light deflection occurs thanks to the geometry of the material portion of the light deflection device, namely the oblique portions of the material portion.

Furthermore, the structure formed by the succession of oblique portions and planar portions over one of the main faces of the light deflection device can be easily made with a reduced bulk, without a substantial light absorption. In addition, the light deflection is obtained simply by laterally illuminating the light deflection device.

With the proposed imaging device, the advantages hereinabove are obtained while preserving a large field of view and a spatial resolution corresponding to the resolution of the imager.

With the proposed imaging device, it is for example possible to guide and multiplex wavelengths of the mid-infrared (MIR) range comprised between 5 μm and 10 μm, or between 6 μm to 9 μm, namely a linewidth around 1,000 $cm^{-1}$ in terms of wavenumber. This is a major advantage compared to optical guides which are generally dimensioned to operate in single-mode in order to carry out their functions. For example, common multiplexers of the "Array Waveguide Gratings", or AWG, type cover an operating spectral range of only one hundred $cm^{-1}$ in terms of wavenumber.

The proposed imaging device also allows homogeneously illuminating a surface area larger than 2.5 $mm^2$, for example in the range of 3×3 $mm^2$, and collecting the photons reflected by the object on such a surface.

The imaging device may be made in the form of a photonic integrated circuit, or PIC ("Photonic Integrated Circuit") wherein the light deflection device sends the light onto the sample rather than onto the imager.

Another advantage is that this imaging device is thermally stable.

In the proposed imaging device, the light deflection device is inserted between the array imager and the sample. The light deflection device serves as a deflector to the light received laterally and emitted at least from the first light source, and also serves as an optical flux distributor with regards to the light backscattered by the sample.

The light deflection device has a generally planar shape and one of its main faces is structured in a stepped or levelled manner. By "stepped structure", it should be understood that one amongst the main faces of the light deflection device has a series of steps with oblique sidewalls each redirecting a given fraction of the incident flux towards the sample. The light deflection device may be viewed as forming a "discretised" parabolic mirror.

The size and the number of steps each formed by an oblique portion and a planar portion next to one another may be determined according to the architecture of the imager (the latter could include an array of photodetectors operating in the visible and/or infrared range, based on semiconductors or based on micro-bolometers for example) and the lighting homogeneity desired for the analysed sample.

The material portion of the light deflection device includes a material that is barely absorbent in the wavelength range of the light emitted by the first light source. For example, if the length of the material portion is equal to 1 cm, to have a light attenuation of at most 10%, the material may be selected such that the imaginary part of its optical index is lower than $10^{-4}$ when considering wavelengths in the visible and infrared ranges. Each of the first and second main faces of the material portion of the light deflection device may have dimensions in the range of one or several $mm^2$, and the thickness (dimension perpendicular to the main face that includes no oblique portions) of the material portion of the light deflection device may be equal to one or several hundred microns, or shorter than 1 mm. Such a geometry is well-suited to the lens-less imaging principle in which the device is very close to the imaged sample.

The imaging device may be configured such that the imager could be arranged at a distance from the sample shorter than 1 mm.

Each pixel of the imager includes at least one photodetector.

Each pixel of the imager is arranged opposite one of the planar portions of said one amongst the first and second main faces. The configuration is advantageous because the planar portions barely hinder the transmission of the signal towards the imager.

In a first embodiment, the imaging device may be such that:

said one amongst the first and second main faces (that one provided with the oblique portions and the planar portions) corresponds to the second main face (that one arranged opposite the imager);

the light intended to be emitted by the first light source is intended to enter the material portion of the light deflection device by the first lateral face;

the material portion of the light deflection device includes a material whose refractive index n1 is higher than the refractive index n2 of the medium in which said material portion is located.

In this first embodiment, the oblique portions carry out a light deflection by total internal reflection of the light that has entered the material portion of the light deflection device, each oblique portion sending back a fraction of the light beam that has entered laterally in the direction of the sample.

In this first embodiment, the device may further include a collimator interposed between the first light source and the first lateral face of the light deflection device. This collimator allows making the light emitted by the first light source homogeneous the cross-section of the light deflection device homogeneous, and thus enables a relatively uniform deflection of the light flux towards the sample.

In a second embodiment, the imaging device may be such that:

said one amongst the first and second main faces (that one provided with the oblique portions and the planar portions) corresponds to the first main face (that one arranged opposite the imager);

the material portion of the light deflection device includes a material whose refractive index n1 is higher than the refractive index n2 of the medium in which said material portion is located;

the oblique portions of said one amongst the first and second main faces are covered by a material that reflects the light intended to be emitted by the first light source.

In this second embodiment, the light deflection corresponds to an external reflection occurring outside the material portion, over the oblique portions covered by the reflective material. An advantage of this second embodiment is that the light beam does not have to be sent into the material portion of the light deflection device.

The reflective material may be totally reflective, i.e. reflect all of the light arriving on the material.

According to one embodiment that can be applied to the first or second embodiment, the oblique portions of said one amongst the first and second main faces may form parallel strips spaced apart from each other by the planar portions.

According to another embodiment that can be applied to the first or second embodiment, the oblique portions may be arranged in a staggered manner and spaced apart from each other by the planar portions.

According to another embodiment that can be applied to the first or second embodiment, the oblique portions may form concentric circles or concentric rectangles spaced apart from each other by the planar portions.

The device may further include a second light source configured to emit a light similar to that emitted by the first light source, wherein the material portion is provided with a second lateral face opposite to the first lateral face and towards which the second light source is intended to emit its light, and wherein the material portion is symmetrical with respect to a plane perpendicular to the other one amongst the first and second main faces. The advantage of such a configuration (applicable to the first or second embodiment) is that, for the same surface of the first and second main faces, the thickness of the material portion could be reduced since oblique portions reflecting the light emitted from the first light sources are located in planes similar to oblique portions reflecting the light emitted from the second light source, these planes being parallel to the other one amongst the first and second main faces.

The material portion may include at least one of the following materials, which are particularly suited to infrared: germanium, undoped silicon, ZnSe, ZnS, chalcogenide glass, $CaF_2$.

The planar portions of said one amongst the first and second main faces and/or the other one amongst the first and second main faces may be covered by an antireflective material. This configuration allows improving the light transmission of the light backscattered by the sample towards the imager while avoiding the parasitic light reflections related to the optical index jumps between the material of the material portion and the medium in which the material portion is located, over the pathway of the light from the sample to the imager. This configuration ultimately improves the effectiveness of the device.

In a particular configuration, the oblique portions may be curved, which may for example allow deflecting the light over an angular cone that is wider than when the oblique portions are not curved, and thus further homogenising lighting of the sample.

The first light source may be configured to emit a light comprising several wavelengths of the visible and/or infrared range.

The invention also relates to a method for making an imaging device configured to image a sample, comprising at least:

providing a first light source configured to emit a light;

making a light deflection device configured to deflect the light intended to be emitted by the first light source towards the sample, comprising a material portion provided with a first main face intended to be arranged opposite the sample, a second main face opposite to the first main face, and a first lateral face towards which the light is intended to be emitted by the first light source;

the making of the light deflection device including making, at one amongst the first and second main faces, oblique portions with respect to the other one amongst the first and second main faces and each configured to deflect a portion of the received light towards the sample, and planar portions parallel to the other one amongst the first and second main faces and configured to let the light backscattered by the sample pass;

providing an imager comprising a plurality of pixels and having a detection face arranged opposite the second main face and intended to receive the light backscattered by the sample;

wherein each pixel of the imager is arranged opposite one of the planar portions of said one amongst the first and second main faces.

The making of the oblique portions and of the planar portions of the material portion of the light deflection device may include the implementation of a laser etching of the material portion.

Throughout the entire document, the term "over" is used irrespective of the orientation in the space of the element to which this term relates. For example, in the feature "over one face", this face is not necessarily oriented upwards but could correspond to a face oriented according to any direction. Furthermore, the arrangement of a first element over a second element should be understood as possibly corresponding to the arrangement of the first element directly against the second element, without any intermediate element between the first and second elements, or as possibly corresponding to the arrangement of the first element over the second element with one or more intermediate element (s) disposed between the first and second elements.

BRIEF DESCRIPTION OF THE DRAWINGS

The present invention will be better understood upon reading the description of embodiments given for merely indicative and non-limiting purposes with reference to the appended drawings, wherein.

Identical, similar or equivalent portions of the different figures described hereinafter bear the same reference numerals so as to facilitate switching from one figure to another.

Figure 1:
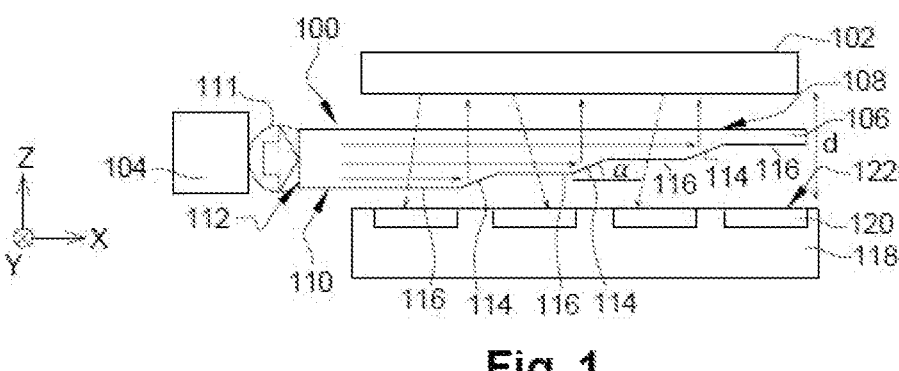
FIG. 1 schematically shows an imaging device, object of the present invention, according to a first embodiment.

The different portions shown in the figures are not necessarily plotted according to a uniform scale, to make the figures more readable.

The different possibilities (variants and embodiments) should not be understood as being exclusive of one another and could be combined together.

DETAILED DISCLOSURE OF PARTICULAR EMBODIMENTS

An imaging device 100 according to a first embodiment and configured to image a sample 102, for example a biological tissue such as skin, is described hereinbelow with reference to FIGS. 1 and 2.

The device 100 comprises at least one first light source 104 configured to emit a light. In the example described herein, the light emitted by the first light source 104 comprises several wavelengths of the visible and/or infrared range. Advantageously, the first light source 104 is able to emit a light comprising wavelengths of the mid-infrared range (MIR), covering in particular a range of wavelengths comprised between 5 µm and 10 µm, or between 6 µm and 9 µm. In addition, according to an advantageous embodiment, the first light source 104 may include at least one QCL-type laser emissive element.

The device 100 also includes a light deflection device configured to deflect the light intended to be emitted by the first light source 104 towards the sample 102. The light deflection device comprises a material portion 106 provided with a first main face 108 intended to be arranged opposite the sample 102, with a second main face 110 opposite to the first main face 108, and with a first lateral face 112 towards which the light is intended to be emitted by the first light source 104. The material of the portion 106 is such that it does not absorb or barely absorbs the light at the level of the portion 106 (which may amount to several mm in the longitudinal direction, i.e. according to the axis X or Y visible in FIG. 1). For example, when the device 100 includes a first light source 104 emitting a light in the infrared range, the material of the portion 106 corresponds, for example, to germanium, non-doped silicon, ZnSe, ZnS, chalcogenide glass, $CaF_2$, etc.

One amongst the first and second main faces 108, 110 of the portion 106 is provided with oblique portions 114 each configured to deflect a portion of the received light towards the sample 102. In the embodiment described with reference to FIGS. 1 and 2, said one amongst the first and second main faces 108, 110 corresponds to the second main face 110. As shown in FIG. 1, the light emitted from the first light source 104 is shown by an arrow and enters the portion 106 by the first lateral face 112. This light propagates across the entire thickness of the portion 106. The rays of this light encountering the oblique portions 114 are diverted from their trajectory, pass through the main face 108 and illuminate the sample 102.

Advantageously, the light emitted by the first light source 104 received by the portion 106 through its first lateral face 112 is collimated so that it propagates according to a direction substantially parallel to the first main face 108. In addition, the light flux preferably enters the portion 106 in a homogeneous manner along the cross-section of the portion 106, i.e., over the entirety of the first lateral face 112, in order to obtain a relatively uniform deflection of the light flux towards the sample 102. For example, such a collimated light propagating uniformly in the portion 106 is obtained by optically coupling the output of the light source 104 to the first lateral face 112 with a collimator 111, for example a ball lens. In the configuration described herein, the light deflection by the oblique portions 114 is obtained by total internal reflection, this phenomenon occurring when:

the portion 116 includes a material whose refractive index n1 is higher than the refractive index n2 of the medium in which the portion 116 is located, this medium consisting for example of air, and the angle $\alpha$, shown in FIG. 1, formed by the oblique portions 114 with respect to the direction of propagation of the light entering the portion 116 is such that $\alpha<\pi/2-\arcsin(n2/n1)$. More specifically, in order to also avoid any total internal reflection at the face 108, the angle $\alpha$ will advantageously comply with the following inequation: $\pi/2-\arcsin(n2/n1)<2\alpha<\pi/2+\arcsin(n2/n1)$.

For example, the material of the portion 106 may be selected such that its index n1 is higher than 2 or 3. Thus, considering that the material of the portion 106 has an optical index n1=3.5, and that the portion 106 is surrounded by air (optical index n2=1), the oblique portions 114 are formed such that the obtained angle $\alpha$ is smaller than 73°, preferably between 37° and 53°. Advantageously, the value of this angle $\alpha$ may be selected as being equal or close to 45°, which allows obtaining a light deflection that is substantially perpendicular to the surface of the sample 102 intended to be illuminated.

The main face provided with the oblique portions 114, i.e. the second main face 110 in the first embodiment, also includes planar portions 116 parallel to the other one amongst the first and second main faces 108, 110 (i.e. parallel to the first main face 108 in the first embodiment described herein) and configured to let the light backscattered by the sample 102 pass. In the example of FIG. 1, this backscattered light is shown by dotted arrows. Thus, this light backscattered by the sample 102 passes through the portion 106 throughout the first main face 108 and throughout the planar portions 116. The backscattered light arriving on the oblique portions 114 either passes through the oblique portions 114, or is reflected obliquely and continues its travel in the optical guide by internal reflection, or will partially illuminate the sample again (this part being nonetheless minor compared to the overall lighting flux). The planar portions 116 may be considered as achieving a distribution of the optical flux backscattered by the sample 102.

Figure 2:
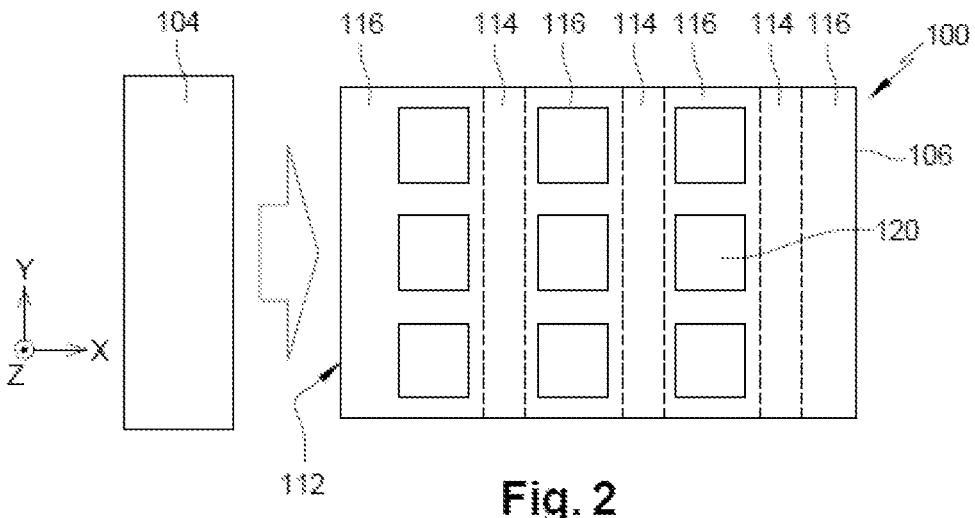
FIG. 2 schematically shows, in top view, the imaging device, object of the present invention, according to the first embodiment.

The portion 106 generally has a planar shape extending in the plane (X, Y) visible in FIGS. 1 and 2. The oblique 114 and planar 116 portions form a stepped (or levelled) structure of one amongst the main faces 108, 110 of the portion 106. The planar portions 116 are parallel to the opposite main face, herein the face 108.

The device 100 further includes an imager 118 configured to detect the light after it has been backscattered by the sample 102 and has passed through the portion 106. The imager 118 comprises a plurality of pixels 120 corresponding for example to micro-bolometers or semiconductor-based photodetectors. These pixels 120 are present at a detection face 122 of the imager 118 which is arranged opposite the second main face 110 of the portion 106. In the embodiment described herein, the pixels 120 are distributed at the detection face 122 of the imager 118 in the form of an array. In addition, each pixel 120 of the imager 118 is advantageously arranged opposite one of the planar portions 116 so that all pixels 120 receive light backscattered by sample 102. For example, the imager 118 may include a 80×80 pixel array with a 34 µm step (therefore with pixels having a side equal to 24 µm, and inter-pixel spaces each equal to 9 µm), namely an active surface of 2.7×2.7 mm². According to an embodiment of the device 100, the oblique portions 114 form parallel strips spaced apart from each other by the planar portions 116. Such a configuration is shown in FIG. 2 which schematically shows a top view of the device 100. In this FIG. 2, the pixels 120 of the imager 118 arranged beneath the portion 106 are shown in order to better understand the arrangement of the oblique portions 114 and of the planar portions 116 with respect to these pixels 120.

During the use of the device 100, the imager 118 is advantageously arranged at a distance d with respect to the sample 102 which is shorter than 1 mm. The thickness (dimension parallel to the axis Z in FIGS. 1 and 2) of the portion 106 and therefore advantageously shorter than this dimension d, and therefore shorter than 1 mm. For example, considering the previously-described imager 118 example, a deflector comprising a linear sidewall with an obliqueness equal to 45° arranged opposite each inter-pixel column may have a thickness in the range of 79×9=711 µm.

In the example shown in FIGS. 1 and 2, only three oblique portions 114 are shown. Nonetheless, the size and the number of oblique portions 114 included in one amongst the first and second main faces 108, 110 of the portion 106 is calibrated according to the architecture of the imager 118 and to the lighting homogeneity desired for the analysed sample 102.

Figure 3:
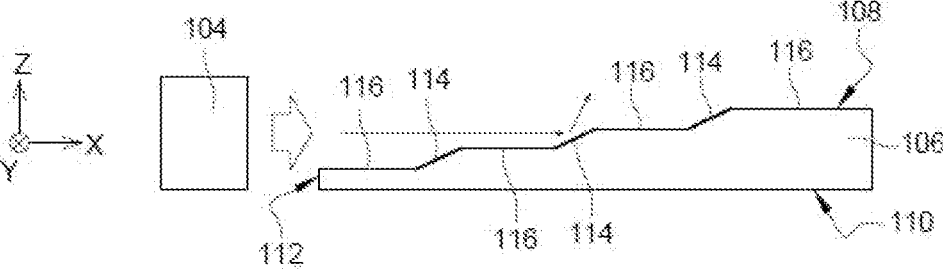
FIG. 3 schematically shows a portion of an imaging device, object of the present invention, according to a second embodiment.

An imaging device 100 according to a second embodiment is described hereinbelow with reference to FIG. 3.

In this second embodiment, the face of the portion 106 comprising the oblique portions 114 and the planar portions 116 corresponds to the first main face 108. The portion 106 includes a material whose refractive index n1 is higher than the refractive index n2 of the medium in which the portion 106 is located. Finally, the oblique portions 114 are covered by a material that reflects the light intended to be emitted by the light source 104, for example a metallic material.

Like in the first embodiment, each pixel 120 of the imager 118 is advantageously arranged opposite one of the planer portions 116 so that all pixels 120 receive light backscattered by the sample 102.

With this second embodiment, the light deflection by the oblique portions 114 is obtained by reflection on the outer surface of the portion 106, and not by total internal reflection like in the first embodiment. Thus, the material of the portion 106 is preferably selected such that its optical index is low in order to best transmit the light backscattered by the sample 102 towards the imager 118, and the oblique portions 114 are covered by an optionally reflective material in order to reflect the light towards the sample 102.

The different examples and variants described before for the first embodiment may also apply to the second embodiment.

Figure 4:
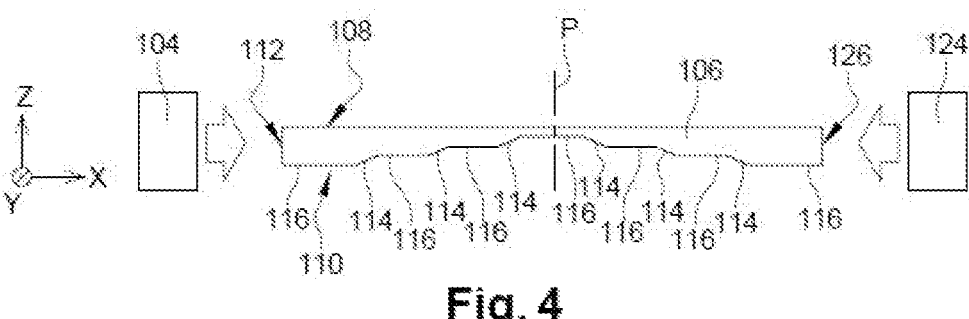
FIG. 4 FIG. 5 FIG. 6, and FIG. 7 schematically show a portion of an imaging device, object of the present invention, according to different variants.

An imaging device 100 according to a variant of the first embodiment is described hereinbelow with reference to FIG. 4.

In this variant, the device 100 further includes a second light source 124 configured to emit a light similar to that emitted by the first light source 104. The portion 106 is provided with a second lateral face 126 opposite to the first lateral face 112 and towards the second light source 124 is intended to emit its light. Furthermore, the portion 106 is symmetrical with respect to a plane perpendicular to the first main face 108 (plane P in FIG. 4). A bilateral lighting of the portion 106 is carried out by the first and second light sources 104, 124. This has the advantage of enabling the portion 106, for the same light deflection, to be made with a reduced thickness compared to the previously-described examples, and that being so for the same light deflection surface.

This variant may also be applied to the previously-described second embodiment.

Figure 5:
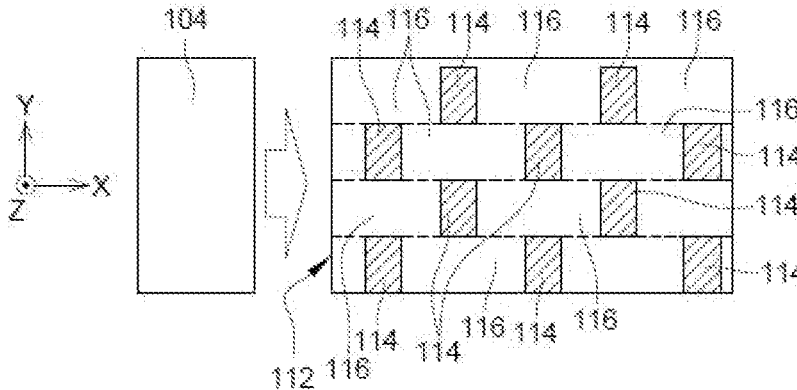

In the different embodiments described before, the oblique portions 114 are made in the form of parallel strips spaced apart from each other by the planar portions 116. Alternatively, the oblique portions 114 may be arranged in a staggered manner and be spaced apart from each other by the planar portions 116, as shown for example in FIG. 5. In this variant although one single light source is shown in FIG. 5, the device 100 may include the second light source 124 and the portion 106 may be symmetrical with respect to a plane perpendicular to the first main face 108. This variant may be applied to the first embodiment or to the second embodiment.

Figure 6:
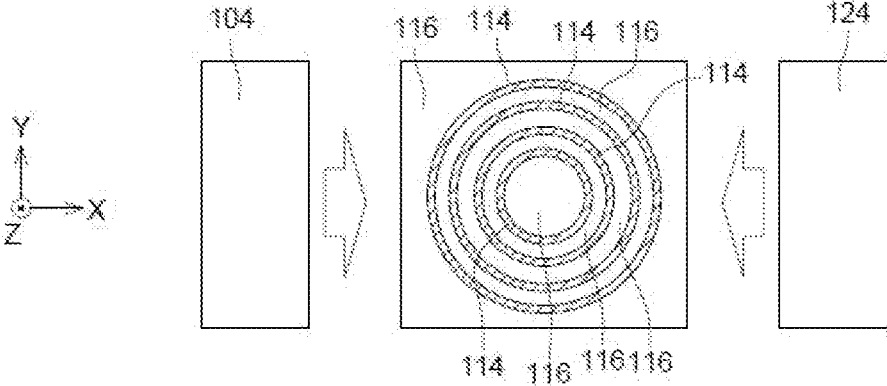

According to another variant, the oblique portions 114 may form concentric circles or concentric rectangles spaced apart from each other by the planar portions 116, as shown for example in FIG. 6 (in this figure, the shown example corresponds to concentric circles). In this variant, although two light sources 104, 124 are shown, the device 100 may include a different number of light sources, for example four light sources each illuminating one of the four lateral faces of the portion 106. This variant may be applied to the first embodiment or to the second embodiment.

Figure 7:
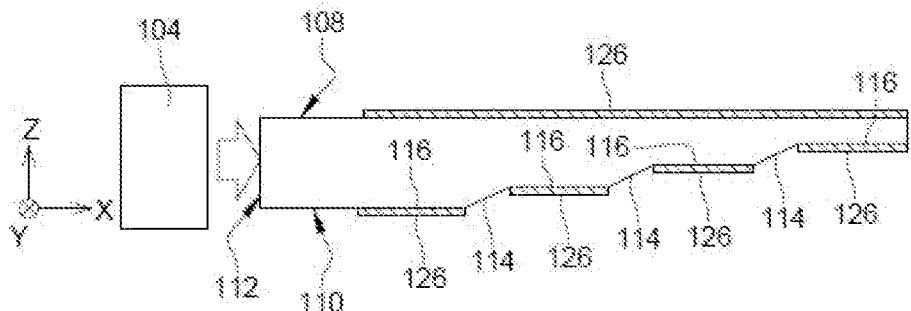

In all of the previously-described embodiments and variants, the planar portions 116 and/or the main face including no oblique portions 114 may be covered by an antireflective material 126, for example ZnS or SiN. Such a configuration based on the first embodiment is shown for example in FIG. 7. The addition of this antireflective material 126 allows reducing the parasitic reflection phenomena related to optical index jumps, and thus improves the effectiveness of the device 100.

In all of the previously-described embodiments and variants, the oblique portions 114 may be curved.

In all of the previously-described embodiments and variants, the material portion 106 may be made by laser etching, or micro-machining. This technique allows adjustable deep etching of the patterns with a lateral size ranging up to a few microns, over a wide range of materials (metals, glasses, Si, sapphire . . . ), and over surfaces of several mm².

It may be considered to finely make a reference mould (for example metallic) by laser micro-machining, which serves afterwards in making the imprint of the patterns with a material that is more economical and/or with a lower optical index such that a resin (assumed to be transparent in the spectral band of interest), the obtained element corresponding to the element 106.

Alternatively, the oblique portions 114 and the planar portions 116 may be obtained through successive lithography and etching, or lithography by direct laser writing, steps. In the second embodiment, the reflective material formed over the oblique portions 114 may be obtained by metal deposition, for example through a masking grid so that only the oblique sidewalls are covered by the deposited material. For example, the material portion 106 may be positioned in a deposition piece of equipment so that it receives a metal deposit sent laterally, so that the deposit then covers almost only the oblique portions 114 and not the planar portions 116.

The invention claimed is:

1. An imaging device configured to image a sample, comprising at least:
   a first light source configured to emit a light;
   a light deflection device configured to deflect the light intended to be emitted by the first light source towards the sample, comprising a material portion provided with a first main face intended to be arranged opposite the sample, a second main face opposite to the first main face, and a first lateral face towards which the light is intended to be emitted by the first light source;
   one amongst the first and second main faces being provided with oblique portions with respect to the other one amongst the first and second main faces and each configured to deflect a portion of the received light towards the sample, and with planar portions parallel to the other one amongst the first and second main faces and configured to let the light backscattered by the sample pass; and
   an imager comprising a plurality of pixels and having a detection face arranged opposite the second main face of the light deflection device and intended to receive the light backscattered by the sample,
   wherein each pixel of the imager is arranged opposite one of the planar portions of said one amongst the first and second main faces,
   wherein the oblique portions are arranged in a staggered manner and spaced apart from each other by the planar portions in a step-wise manner such that a distance between the first main face and the second main face changes along a length of the light deflection device, and
   wherein only the planar portions of said one amongst the first and second main faces and/or the other one amongst the first and second main faces are covered by an antireflective material.

2. The imaging device according to claim 1, wherein:
   said one amongst the first and second main faces corresponds to the second main face;
   the light intended to be emitted by the first light source is intended to enter the material portion of the light deflection device by the first lateral face;
   the material portion of the light deflection device includes a material whose refractive index n1 is higher than the refractive index n2 of the medium in which said material portion is located.

3. The imaging device according to claim 2, further including a collimator interposed between the first light source and the first lateral face of the light deflection device.

4. The imaging device according to claim 1, wherein:

said one amongst the first and second main faces corresponds to the first main face;

the material portion of the light deflection device includes a material whose refractive index n1 is higher than the refractive index n2 of the medium in which said material portion is located;

the oblique portions of said one amongst the first and second main faces are covered by a material that reflects the light intended to be emitted by the first light source.

5. The imaging device according to claim 1, wherein the oblique portions of said one amongst the first and second main faces form parallel strips spaced apart from each other by the planar portions.

6. The imaging device according to claim 1, wherein the oblique portions form concentric circles or concentric rectangles spaced apart from each other by the planar portions.

7. The imaging device according to claim 1, further including a second light source configured to emit a light similar to that emitted by the first light source wherein the material portion is provided with a second lateral face opposite to the first lateral face and towards which the second light source is intended to emit its light, and wherein the material portion is symmetrical with respect to a plane perpendicular to the other one amongst the first and second main faces.

8. The imaging device according to claim 1, wherein the material portion includes at least one of the following materials: germanium, undoped silicon, ZnSe, ZnS, $CaF_2$, chalcogenide glass.

9. The imaging device according to claim 1, wherein the oblique portions are curved.

10. A method for making an imaging device configured to image a sample, comprising at least:

providing a first light source configured to emit a light;

making a light deflection device configured to deflect the light intended to be emitted by the first light source towards the sample, comprising a material portion provided with a first main face intended to be arranged opposite the sample, a second main face opposite to the first main face, and a first lateral face towards which the light is intended to be emitted by the first light source;

the making of the light deflection device including making, at one amongst the first and second main faces, oblique portions with respect to the other one amongst the first and second main faces and each configured to deflect a portion of the received light towards the sample, and planar portions parallel to the other one amongst the first and second main faces and configured to let the light backscattered by the sample pass; and providing an imager comprising a plurality of pixels and having a detection face arranged opposite the second main face and intended to receive the light backscattered by the sample, wherein each pixel of the imager is arranged opposite one of the planar portions of said one amongst the first and second main faces, wherein the oblique portions are arranged in a staggered manner and spaced apart from each other by the planar portions in a step-wise manner such that a distance between the first main face and the second main face changes along a length of the light deflection device, and wherein only the planar portions of said one amongst the first and second main faces and/or the other one amongst the first and second main faces are covered by an antireflective material.

11. The method according to claim 10, wherein the making of the oblique portions and of the planar portions of the material portion of the light deflection device includes the implementation of a laser etching of the material portion.

\*   \*   \*   \*   \*